United States Patent

Finnochiaro

[11] Patent Number: 5,549,923
[45] Date of Patent: Aug. 27, 1996

[54] STARCH CONTAINING REDUCED FAT PEANUT BUTTER AND METHOD OF MANUFACTURE

[75] Inventor: Eugene T. Finnochiaro, Milton, Mass.

[73] Assignee: Opta Food Ingredients, Inc., Bedford, Mass.

[21] Appl. No.: 219,983

[22] Filed: Mar. 30, 1994

[51] Int. Cl.⁶ .............................. A23L 1/38; A23L 1/0522
[52] U.S. Cl. ............................................ 426/633; 426/661
[58] Field of Search ...................................... 426/632, 633, 426/661, 11

[56] References Cited

U.S. PATENT DOCUMENTS

| | | | |
|---|---|---|---|
| 2,068,051 | 6/1936 | Canton et al. | 426/633 |
| 4,615,892 | 10/1986 | Morehouse et al. | 246/250 |
| 4,673,578 | 6/1987 | Becker et al. | 426/93 |
| 4,800,097 | 1/1989 | Morris et al. | 426/632 |
| 4,814,195 | 3/1989 | Yokoyama et al. | 426/426 |
| 5,079,027 | 1/1992 | Wong et al. | 426/633 |
| 5,302,409 | 4/1994 | Franklin | 426/633 |
| 5,312,641 | 5/1994 | Castillo, Jr. | 426/633 |
| 5,364,471 | 11/1994 | Czuchajowska et al. | 127/65 |

FOREIGN PATENT DOCUMENTS

| | | |
|---|---|---|
| 414290A1 | 2/1991 | European Pat. Off. . |
| 2007961 | 5/1979 | United Kingdom . |

*Primary Examiner*—Helen Pratt
*Attorney, Agent, or Firm*—Hamilton, Brook, Smith & Reynolds, P.C.

[57] ABSTRACT

A reduced fat peanut butter product comprising ground peanuts and native starch, particularly garbanzo bean starch, is described. The reduced fat peanut butter product is produced by reducing or substantially replacing fat and/or sugar with native starch.

8 Claims, 2 Drawing Sheets

STARCH CONTAINING REDUCED FAT PEANUT BUTTER AND METHOD OF MANUFACTURE

BACKGROUND

Peanut butter is a cohesive, comminuted mixture of ground peanut particles suspended in liquid peanut oil. Peanut butter is prepared by roasting, blanching and grinding shelled peanuts to form a peanut paste. During the grinding step, the cellular structure of the peanuts is ruptured releasing the peanut oil in which the pulverized peanut particles become suspended. A stabilizing agent such as a high melting point fat is generally added to the peanut paste to prevent separation of the phases. An emulsifying agent, a sweetening agent, and salt may also be added to the peanut paste.

The protein content of peanut butter is from about 26% to about 30% making peanut butter a nutritious food. The oil or fat content of peanut butter, however, is from about 48% to about 53% mitigating the nutritional value of peanut butter. Accordingly, low-fat peanut butters having the flavor and texture of conventional peanut butters are desirable.

Attempts to make low-fat peanut butter have generally focused on removing a portion of the peanut oil found in peanuts and replacing the oil with a low-fat and low calorie filler substitute. These low-calorie peanut butter compositions have generally been unsatisfactory because the peanut oil removal step tends to also remove a portion of the flavor components from the peanut butter resulting in a peanut butter with poor taste. In addition, the low-fat filler substitutes generally do not provide the texture and consistency properties of conventional peanut butter.

Removing peanut oil from peanut butter results in a peanut butter lacking flavor and adding low-fat filler substitutes results in a peanut butter with poor texture and consistency. Thus it would be commercially advantageous to provide a reduced-fat peanut butter composition which has the flavor and consistency of conventional peanut butter.

SUMMARY OF THE INVENTION

The invention pertains to a peanut butter product comprising ground peanuts and native starch having a reduced fat content compared to traditional peanut butter formulations. The preferred starch is garbanzo bean starch which has reduced oil/water binding and aids in maintaining low water activity without adversely affecting texture. The presence of the native starch in the peanut butter formulation serves as a bulking agent to reduced or substantially replace fat and/or sugar. The reduced fat peanut butter has an overall smooth texture and organoleptic properties similar to full fat peanut butter products. Native starch is bland in flavor and thus does not impart off-flavors to the peanut butter compared to modified starches which typically impart flavors to the food. Over storage, the reduced fat peanut butter does not exhibit phase or oil separation.

DETAILED DESCRIPTION OF THE INVENTION

The present invention pertains to a peanut butter product that has a reduced fat content. The term "peanut butter product" is intended herein to include peanut butter, peanut spreads and imitation peanut butters. The peanut butter product can be creamy, crunchy, old-fashioned or natural.

The fat content of the peanut butter is reduced by adding a native starch into the ingredients for making a peanut butter product. The term "native starch" is intended herein to mean any starch that possesses starch granules and has not been pregelatinized, derivatized or mechanically, thermally or chemically modified. The starch can be from corn, pea, garbanzo bean, potato, wheat, rice, tapioca, sorghum, barley, waxy maize, milo, arrowroot, waxy rice and waxy milo. The preferred starch is garbanzo bean starch because it is bland in flavor and has reduced oil and water binding to maintain low water activity. Other starch sources not listed herein can likewise be used.

The amount of native starch added to a peanut butter formulation will depend upon the degree of fat reduction desired. Preferably the amount of starch will be from about 5 to about 50 percent by weight, with from about 6 to about 25 percent by weight being most preferred.

Other ingredients, such as peanut parts, emulsifying agents, sweetening agents, salt, flavoring agents, preservatives, stabilizing agents and antioxidants can be added to the reduced fat peanut butter product.

Preparation of a reduced fat peanut butter product of this invention will not require specialized equipment or processing steps. The native starch can simply be added to the ingredients for making a peanut butter product and mixed under shear until the starch is uniformly dispersed therein. In the Example Section, the reduced fat peanut butter product will be prepared by cutting native starch into a peanut butter product. In essence, the peanut butter product is diluted with native starch.

Figure 1:
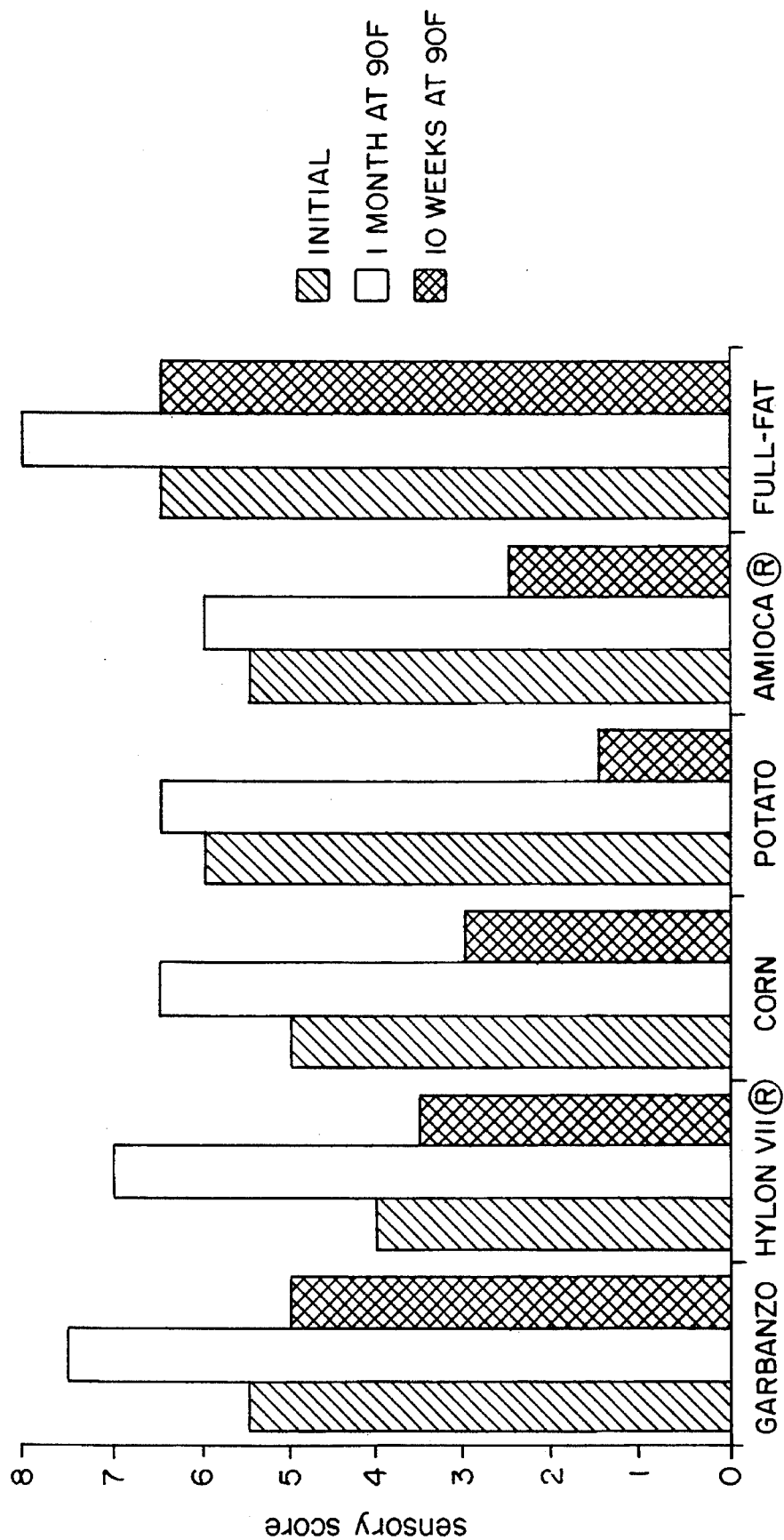
FIG. 1 is a bar graph showing overall textural preference of reduced fat peanut butter products. The first bar for each group corresponds to a measurement taken at the time the product was made. The second and third bars in each starch grouping correspond to measurements taken at 1 month (90° F.; 32° C.) and 10 weeks (90° F.; 32° C.), respectively. The sensory scores are rated with zero being inferior and 9 being preferred.
Figure 2:
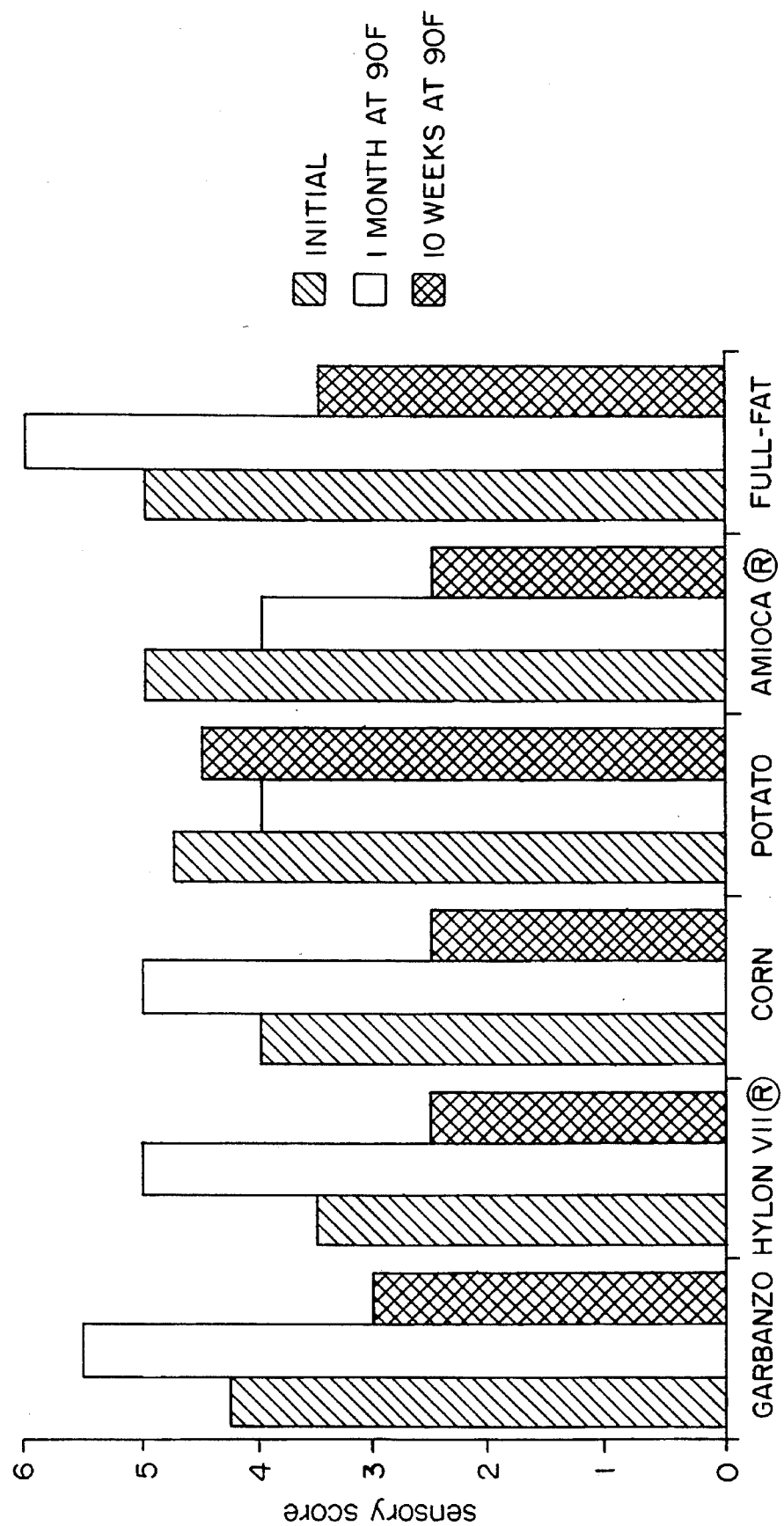
FIG. 2 is a bar graph of flavor quality taken at the time the product was made, 1 month (90° F.; 32° C.) and 10 weeks (90F.; 32C.). The sensory scores are rated with zero being inferior and 9 being preferred.

The resulting reduced fat peanut butter will have a smooth texture and organoleptic properties similar to full fat peanut butter products. Further, due to the bland flavor of native starches, off-flavors will not be detected in the peanut butter product. This is an advantage over modified starches because modified starches typically have off-flavors. Over storage, the reduced fat peanut butter product will not exhibit surface cracking or oil separation. Reduced fat peanut butter products containing native starch were compared to full fat peanut butter products. The overall texture (FIG. 1) and flavor quality (FIG. 2) were evaluated for reduced fat peanut butter products containing various native starches, compared to full fat peanut butters. A reduced fat peanut butter containing garbanzo bean starch was comparable to full fat peanut butter, in both texture and flavor.

The invention will be further illustrated by the following non-limiting exemplification.

Exemplification

Reduced-fat Peanut Butter

1. Ingredients

SKIPPY™ peanut butter purchased locally at retail outlet.

Native garbanzo starch supplied by Opta Food Ingredients.

Native high amylose corn starch (Hylon VII™) manufactured by National Starch Chemical Company.

Native high amylopectin corn starch (AMIOCA™) manufactured by American Maize.

Regular (dent) corn starch purchased locally at retail outlet.

Native potato starch manufactured by Avebe Company.

| Formulation Ingredients | Percentage |
|---|---|
| Peanut Butter | 75.00 |
| Starch | 25.00 |
| | 100.00 |

3. Process

1. Both ingredients were heated to 170° F. (76° C.) by placing in a conventional oven.
2. The warmed peanut butter was placed in a bowl of a mini food processor (SUNBEAM OSKAR®).
3. The warmed starch was blended in using maximum shear until uniformly dispersed (3–5 minutes).
4. The mixture was cooled to 95°–100° F. (35°–37.8C.) before filling containers.

4. Storage

Five native starch granules [garbanzo, high amylose corn, high amylopectin corn, regular (dent) corn, potato] were formulated as above and placed into accelerated (90° F.; 32 C.) storage. Full-fat controls (both with and without above processing) were also placed into accelerated storage.

5. Sensory Analysis

Samples were paneled by consensus with 3 expert tasters. Evaluation after 10 weeks and 1 month accelerated storage indicated all performed well in storage in regards to texture and phase separation. See FIG. 1 which shows overall textural preference and FIG. 2 which shows flavor quality evaluations for peanut butters containing various native starches. Garbanzo starch was the preferred sample with overall textural preference, smoothness and flavor quality closest to the full-fat controls. No off flavors, surface cracking or oil separation was observed in any of the test samples.

6. Texture Analysis

Adhesive forces and work were measured using a TA-XT2 Texture Analyzer (Texture Technologies Corporation, 18 Fairview Road, Scarsdale, N.Y. 10583) equipped with a 2 inch diameter (flat) probe. Peak adhesive force (maximum force required to pull away from sample) and adhesive work (total force in kilogram over time to pull completely away from sample) were measured by inserting the probe as a constant three kilogram force before pulling the probe up 20 mm (@1 mm/sec). All samples were equilibrated overnight at room temperature before testing. Results of storage testing are summarized in the Table and indicate changes of adhesive peak force and work during storage were the same or less than the full-fat control for all except one sample (potato starch). Nonetheless, sensory testing (FIGS. 1 and 2) indicated all test samples were quite acceptable as finished products.

TABLE

Peanut Butter Storage Texture Analysis After 10 Weeks

| | TA-XT2 Peak Adhesive Force (kg) | | | TA-XT2 Adhesion "Work" (kg/s) | | |
|---|---|---|---|---|---|---|
| Sample | Initial | 10 wk @ 90° F. (32° C.) | % Change | Initial | 10 wk @ 90° F. (32° C.) | % Change |
| Full fat control | 8.89 | 7.00 | −21.30 | 5.16 | 3.65 | −29.30 |
| High amylose corn starch | 6.26 | 5.37 | −14.20 | 4.10 | 4.34 | 5.90 |
| Native garbanzo starch | 6.59 | 5.31 | −19.40 | 4.41 | 4.00 | −9.30 |
| High amylopectin corn starch | 6.19 | 4.92 | −20.50 | 3.92 | 4.39 | 12.00 |
| Native potato starch | 8.67 | 6.20 | −28.50 | 4.70 | 3.58 | −28.30 |
| Native corn starch | 5.88 | 5.79 | −1.50 | 5.20 | 4.05 | −22.20 |

Equivalents

Those skilled in the art will recognize, or be able to ascertain using no more than routine experimentation, many equivalents to the specific embodiments of the invention described herein. Such equivalents are intended to be encompassed by the following claims:

I claim:

1. A reduced fat peanut butter product comprising ground peanuts in a continuous oil phase and from about 5 to about 50 percent by weight native starch.

2. The reduced fat peanut butter product of claim 1 wherein the native starch is selected from the group consisting of corn, pea, potato, garbanzo bean, wheat, rice, tapioca, sorghum, barley, waxy maize, milo, arrowroot, waxy rice and waxy milo.

3. A reduced fat peanut butter product comprising ground peanuts in a continuous oil phase and native garbanzo bean starch.

4. The reduced fat peanut butter product of claim 3 wherein the native garbanzo bean starch is present in an amount of from about 5 to about 50 percent by weight.

5. A method for producing a reduced fat peanut butter product, the improvement comprising incorporating native starch into a peanut butter composition to reduce or substantially replace fat and/or sugar, such that the peanut butter product contains from about 5 to about 50 percent by weight native starch.

6. The method of claim 5 wherein the native starch is selected from the group consisting of corn, pea, potato, garbanzo bean, wheat, rice, tapioca, sorghum, barley, waxy maize, milo, arrowroot, waxy rice and waxy milo.

7. The method of claim 6 wherein the native starch is garbanzo bean starch.

8. A reduced fat peanut butter product comprising ground peanuts in a continuous oil phase and from about 5 to about 50 percent by weight native starch, wherein the peanut butter product has a reduced fat content in comparison with full fat peanut butter.

\* \* \* \* \*